United States Patent [19]
Chan et al.

[11] Patent Number: 5,978,860
[45] Date of Patent: Nov. 2, 1999

[54] SYSTEM AND METHOD FOR DISABLING AND RE-ENABLING AT LEAST ONE PERIPHERAL DEVICE IN A COMPUTER SYSTEM BY MASKING A DEVICE-CONFIGURATION-SPACE-ACCESS-SIGNAL WITH A DISABLE OR RE-ENABLE SIGNAL

[75] Inventors: Wai-Ming Richard Chan; Stuart Hayes; James Van Artsdalen, all of Austin, Tex.

[73] Assignee: Dell USA, L.P., Round Rock, Tex.

[21] Appl. No.: 08/910,703

[22] Filed: Aug. 13, 1997

Related U.S. Application Data

[63] Continuation-in-part of application No. 08/485,056, Jun. 7, 1995, Pat. No. 5,692,219.

[51] Int. Cl.⁶ .................................................. G06F 13/14
[52] U.S. Cl. ........................... 710/8; 710/200; 710/260; 711/170; 711/163
[58] Field of Search .................................. 710/8, 36, 49, 710/200, 260; 711/170, 163

[56] References Cited

U.S. PATENT DOCUMENTS

| | | | |
|---|---|---|---|
| 5,379,384 | 1/1995 | Solomon | 710/128 |
| 5,446,869 | 8/1995 | Padgett et al. | 395/500 |
| 5,450,551 | 9/1995 | Amini et al. | 395/299 |
| 5,471,590 | 11/1995 | Melo et al. | 395/288 |
| 5,499,346 | 3/1996 | Amini et al. | 395/308 |
| 5,517,650 | 5/1996 | Bland et al. | 395/750 |
| 5,522,050 | 5/1996 | Amini et al. | 395/306 |
| 5,550,989 | 8/1996 | Santos | 395/306 |
| 5,557,758 | 9/1996 | Bland et al. | 395/308 |
| 5,692,219 | 11/1997 | Chan et al. | 710/49 |
| 5,737,765 | 4/1998 | Shigeeda | 711/170 |
| 5,764,996 | 6/1998 | Armstrong et al. | 710/260 |

Primary Examiner—Thomas C. Lee
Assistant Examiner—Abdelmonieml Elamin
Attorney, Agent, or Firm—Skjerven, Morrill, MacPherson, Franklin & Friel LLP; Stephen A. Terrile

[57] ABSTRACT

A system and method for disabling and re-enabling peripheral devices (PDs) in a computer system is disclosed. The system includes a CPU, a host bus coupled to the CPU, a host-bus-to-peripheral-device-bus (HB/PDB) bridge coupled to the host bus, at least one PD, at least one peripheral device bus coupling the HB/PDB bridge and at least one PD, and a device, typically in the form of a digital gate, for selectively disabling and re-enabling at least one PD. The disclosed method operates in connection with a computer system having a CPU, a HB/PDB bridge coupled to the CPU and capable of sending a device-configuration-space-access-signal (DCSAS) to the DCSAS input pin of a target PD when attempting an access operation, such as a read or a write operation, on the target PD, and one or more system I/O registers having a CONFIG ENABLE bit that reflects a user's request to disable or re-enable a PD. The method intercepts the DCSAS before it reaches the DCSAS input pin of the target PD, provides the intercepted DCSAS to the input of a digital gate such as an AND gate, provides a signal corresponding to the CONFIG ENABLE bit to the input of the same digital gate, and delivers the resulting output signal from the digital gate to the DCSAS input pin of the target PD.

14 Claims, 4 Drawing Sheets

SYSTEM AND METHOD FOR DISABLING AND RE-ENABLING AT LEAST ONE PERIPHERAL DEVICE IN A COMPUTER SYSTEM BY MASKING A DEVICE-CONFIGURATION-SPACE-ACCESS-SIGNAL WITH A DISABLE OR RE-ENABLE SIGNAL

The present application is a continuation-in-part of U.S. Ser. No. 08/485,056 filed Jun. 7, 1995, now U.S. Pat. No. 5,692,219.

BACKGROUND OF THE INVENTION

This invention relates to a system and method for disabling and re-enabling peripheral devices (PDs) containing a device-configuration-space through hardware by controlling device-configuration-space-access-signals (DCSASs) to the PDs using system Input/Output (I/O) registers. The invention advantageously permits users to disable and re-enable user-selected onboard PDs, such as video controllers or Small Computer System Interface (SCSI) controllers. Users may, for example, wish to substitute another PD in place of a particular PD provided by the computer manufacturer. In other cases, users may wish to disable a particular PD either temporarily or indefinitely.

At the present time, several computer manufacturers provide a user-initiated software method of disabling PDs. The software that accomplishes disablement of PDs is typically found in the Basic Input/Output System (BIOS) memory of a computer system. (BIOS is the firmware in a personal computer that interfaces directly with the hardware to perform I/O and other low-level functions. Typically this firmware is permanently stored in Read Only Memory or flash memory on the computer system's motherboard.) Subsequently, when the computer system is powered on, the system's Power On Self Test (POST) is executed. During POST, software contained in BIOS memory determines which PDs are disabled. Upon determining that a particular PD is disabled, the BIOS software does not initialize and execute the Read-Only Memory (ROM) associated with that device. However, a configuration space for each onboard PD is still accessible to system software, including operating system software. This configuration space remains accessible because typical peripheral device/bus standards do not recognize disablement of PDs by BIOS software.

As operating system software has become increasingly sophisticated, there has developed a clear trend toward automatically configuring all devices attached to the computer system, including PDs. Certain recent generations of operating systems—e.g., Microsoft Windows NT, and the Microsoft Windows 95 product—are likely to continue this trend. Specifically, the operating system software will endeavor to detect all accessible hardware associated with a computer system. The operating system software will detect and have access to the disabled PD's configuration space and possibly attempt to initialize it. Thus, despite a user's express request to disable a particular PD, the operating system software will detect the PD's configuration space and re-activate it.

Therefore, what is needed is a hardware-based method for disabling the PDs of a computer system to avoid the problem of operating system software detecting disabled PDs and initializing them in contravention of a user's requests.

SUMMARY OF THE INVENTION

In a method in accordance with the invention, executable software contained in BIOS memory controls the state of a DCSAS to a PD using I/O registers of a computer system. Using utility software contained in BIOS memory, a user can disable or re-enable one or more PD(s) by submitting a request that the desired enablement status of the PD(s) be either disable or re-enable. Upon a request to disable a device, the software contained in the BIOS memory will control the state of the DCSAS to the affected PD. In response to an I/O inquiry from, for example, the operating system, the PD will generate a DCSAS. In a possible hardware implementation of the invention, the DCSAS might be sent over a physical line in a peripheral bus architecture. The DCSAS is then "gated" such that operating system software, such as Microsoft Windows NT or Microsoft Windows 95, cannot detect the presence of a disabled PD and attempt to reactivate the PD. Thus, the invention uses a "gated" DCSAS to disable and re-enable a PD at a user's request via a BIOS routine.

DETAILED DESCRIPTION OF SPECIFIC EMBODIMENTS

One implementation of the invention is described here for purposes of illustration, namely a hardware-based method of disabling one or more PD(s) in a computer system by using system I/O registers to control the state of the DCSAS to the target device(s). The machine-executed method is invoked at the user's request and is performed by executable computer software contained in BIOS memory. An actual implementation of such computer code might be executable on an Intel 80×86-based or Pentium™-based computer system, or on other suitable processor-based computer systems.

(It will be appreciated by those of ordinary skill, of course, that references to the performance of method steps by computer software actually mean that a computer, or one of its components, is performing the method steps in response to the instructions encoded in the computer software.)

In the interest of clarity, not all features of an actual implementation are described in this specification. It will, of course, be appreciated that in the development of any such actual implementation (as in any hardware or software development project), numerous design and programming decisions must be made to achieve the developers' specific goals and subgoals (e.g., compliance with system-related and business-related constraints), which will vary from one implementation to another. Moreover, attention will necessarily be paid to, e.g., proper serialization to handle concurrent events. It will be appreciated that a development effort of this type might be complex and time-consuming, but would nevertheless be a routine undertaking of computer system design and development for those of ordinary skill having the benefit of this disclosure.

Figure 1:
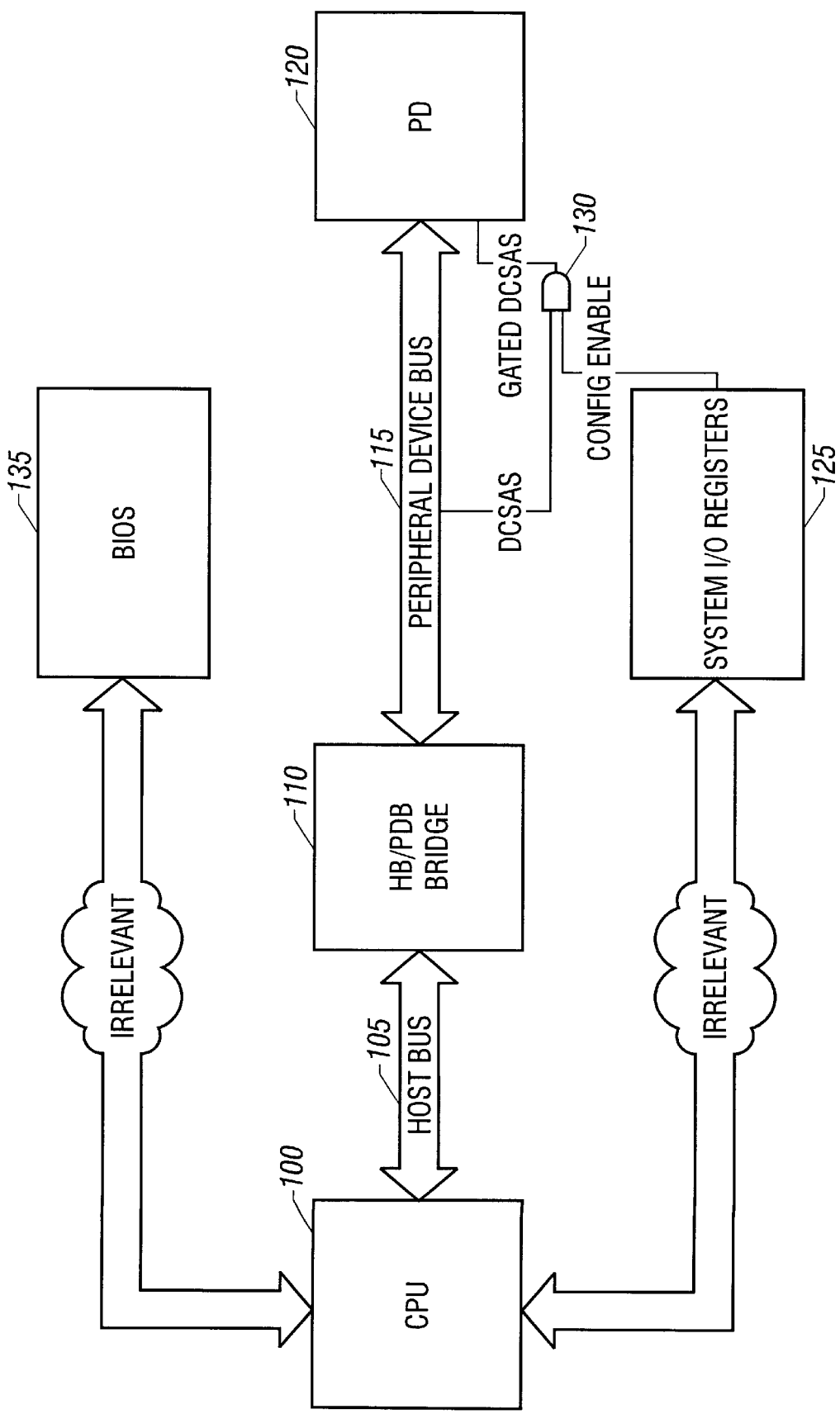
FIG. 1 is a block-diagram view of a computer system with components used in a method in accordance with the present invention including one PD.

Depicted now in FIG. 1 is a high-level block diagram of the computer system operating environment in which the method of the present invention may be implemented. The elements of a computer system not necessary to understand the operation of the present invention have been omitted for simplicity. The computer system includes central processing unit (CPU) 100 which is coupled to host bus 105. Host bus 105 includes address, data, and control portions. The host bus 105 is coupled to host-bus-to-peripheral-device-bus (HB/PDB) bridge 110, which, in turn, is coupled to peripheral device bus 115. HB/PDB bridge 110 is a microchip that controls peripheral device bus 115.

Peripheral device bus 115 may use any peripheral device/bus standard that supports relatively high data-transfer speeds and that automatically configures devices compliant with the particular standard that are added to, changed, or removed from a computer system utilizing that chosen standard bus architecture. Advantages of using such bus standards include greater speed than that obtainable from Industry Standard Architecture (ISA) and Extended Industry Standard Architecture (EISA) buses, as well as automatic configuration of devices compliant with the particular standard. Automatic configuration of PDs is accomplished, in part, by information provided in registers contained in the PDs themselves. The content and addressable locations of the registers contained in the PDs are dictated by the standard for the bus architecture that has been chosen.

Those of ordinary skill in the art will recognize that there are many peripheral device/bus standards including, but not limited to, Peripheral Component Interconnect (PCI) and Accelerated Graphics Port (AGP). Those of ordinary skill in the art will also recognize that examples of DCSASs include, but are not limited to, Initialization Device Select (IDSEL) signals, A16 signals, or any other signals specified for use as DCSASs by an applicable peripheral device/bus standard.

Figure 2:
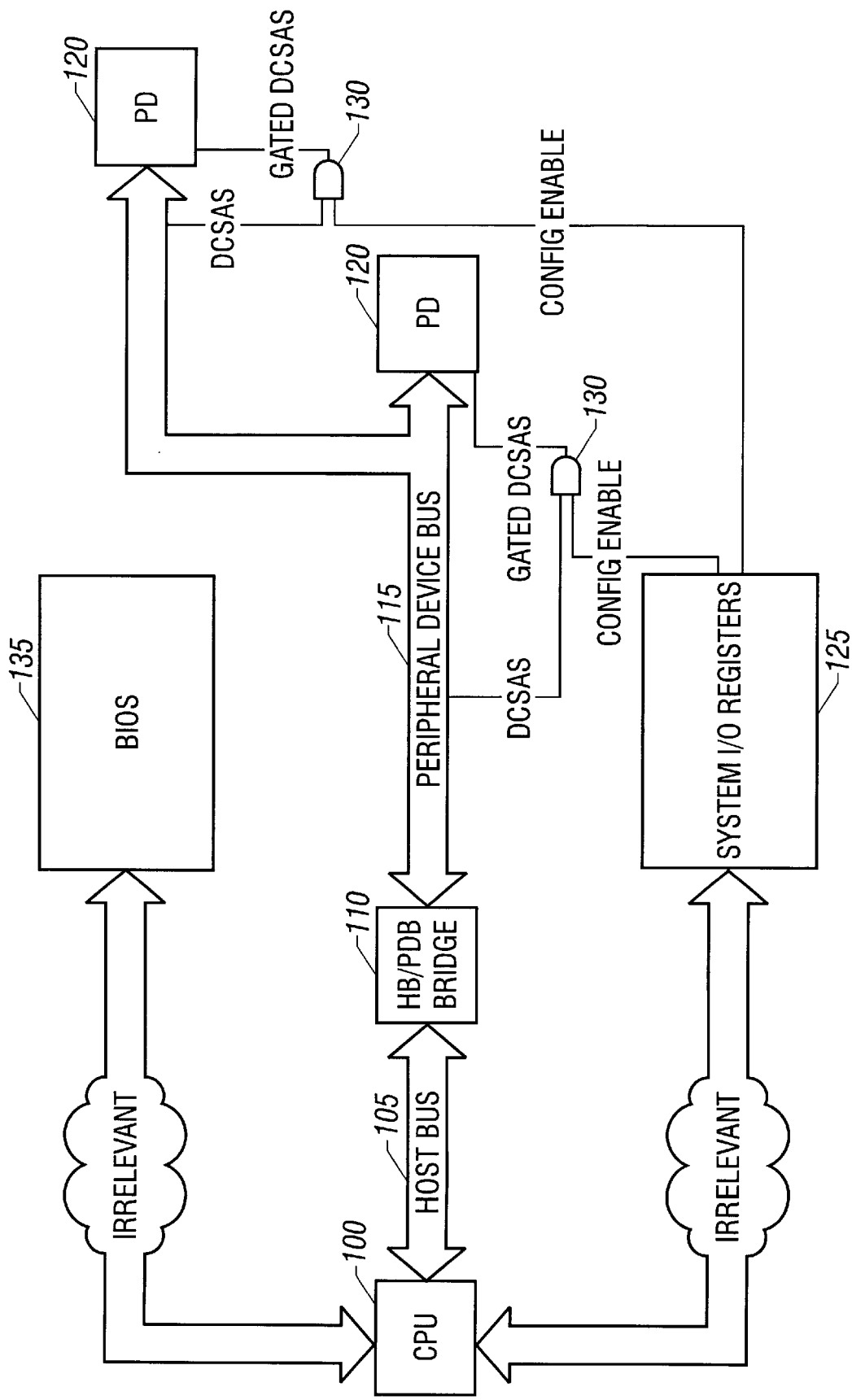
FIG. 2 is a block-diagram view of a computer system with components used in a method in accordance with the present invention including multiple PDs.
Figure 2A:
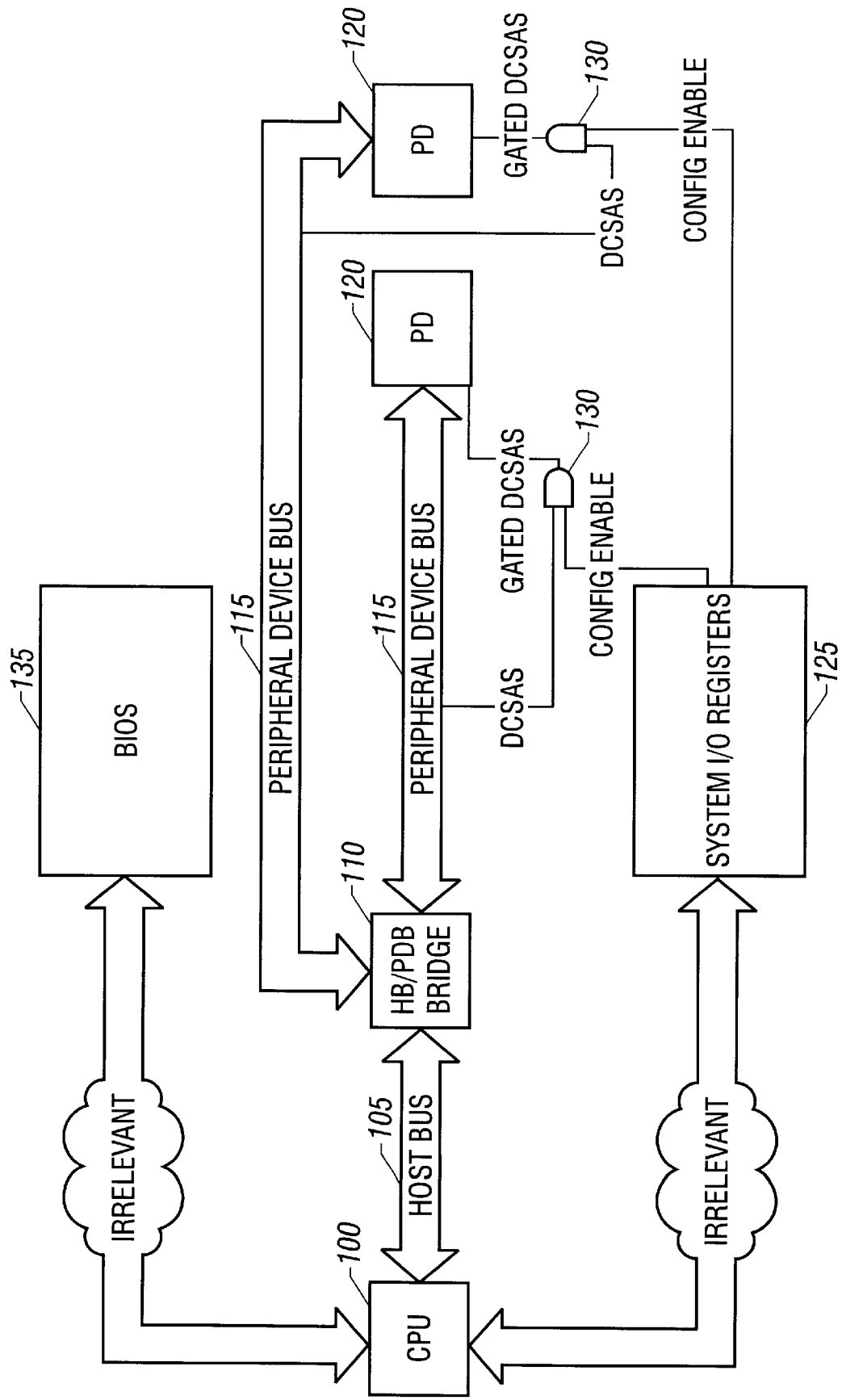
FIG. 2(a) is a block-diagram view of a computer system with components used in a method in accordance with the present invention including multiple peripheral device buses.
Figure 3:
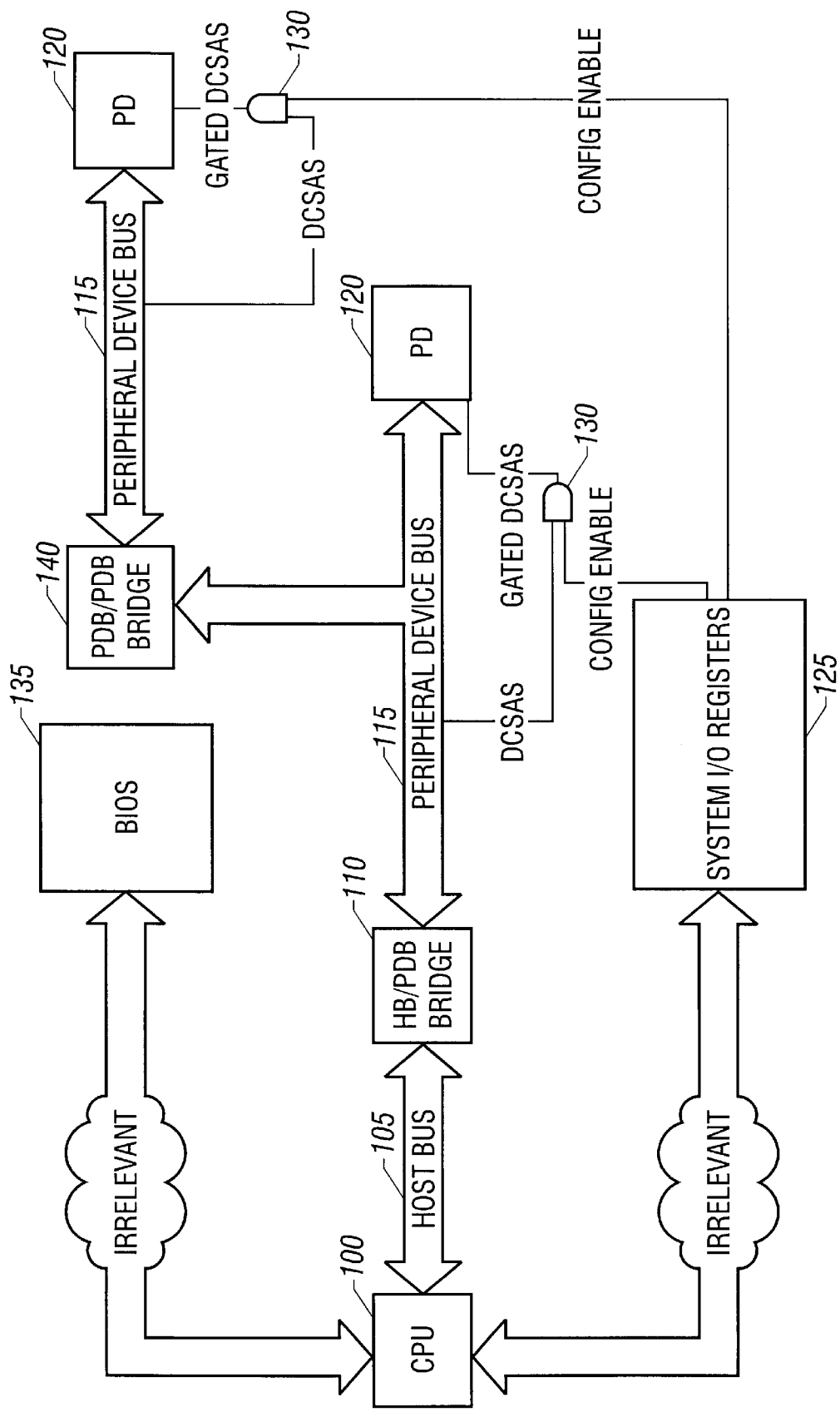
FIG. 3 is a block-diagram view of a computer system with components used in a method in accordance with the present invention including one or more PD(s) and one or more peripheral-device-bus-to-peripheral-device-bus (PDB/PDB) bridge(s).

Peripheral device bus 115 may be coupled to one PD 120. In an alternative configuration illustrated in FIG. 2, peripheral device bus 115 may be coupled to more than one PDs 120. In yet another alternative configuration illustrated in FIG. 2(*a*), multiple peripheral device buses 115 may be coupled to one or more HB/PDB bridge(s) and one or more PD(s) 120. Moreover, as illustrated in FIG. 3, multiple peripheral device buses 115 may be bridged together with one or more peripheral-device-bus-to-peripheral-device-bus (PDB/PDB) bridge(s) 140. PDB/PDB bridge 140 is a microchip that controls the interactions and transactions between the peripheral device buses 115 connected to said PDB/PDB bridge.

HB/PDB bridge 110 can produce a DCSAS across peripheral device bus 115. In addition, PDB/PDB bridge 140 can produce a DCSAS across peripheral device bus 115. The DCSAS can be received by a DCSAS input pin on PD 120 when said device 120 is the target of an access operation, such as a read operation or a write operation. In this sense, the DCSAS input pin functions very much like a classical "chip select" signal.

The present invention allows the user to disable a PD via hardware-based control of the DCSAS. In one implementation, the DCSAS from peripheral device bus 115 directed to the target PD 120 is gated through AND gate 130. Thus, the DCSAS signal from peripheral device bus 115 serves as one input to AND gate 130. The second input to AND gate 130 is CONFIG ENABLE signal from a bit set in system I/0 registers 125. In the present illustration, system I/O registers 125 can be system-specific registers with addressable locations known only to the manufacturer of a given computer system, but not generally known to third party hardware or software developers. Because the addressable locations of system I/O registers 125 are in undocumented locations, system software developers, including developers of operating system software such as Microsoft Windows NT or Microsoft Windows 95, do not attempt to access them. Alternatively, the addressable locations of system I/O registers 125 could be fully documented and made known to third party developers, but be implemented as "write once" registers, as is well known in the art. If implemented as "write once" registers, the bit corresponding to CONFIG ENABLE would be set once during POST, and then remain unchangeable until the computer system is re-booted. Under either of these implementations, the CONFIG ENABLE signal is generated from a bit set in system I/O registers 125, said bit being set by software contained in the computer system BIOS 135.

Responsive to a request by the user to deactivate or re-activate a particular PD 120, software contained in the computer system BIOS 135 can either set a bit in system I/O registers 125 to either a '1' or '0.' This bit is identified as CONFIG ENABLE, and provides the second input to AND gate 130. Whether the system I/O registers 125 are implemented in undocumented addressable locations or as "write once" registers, the software contained in BIOS 135 will manipulate the CONFIG ENABLE bit in response to requests for deactivation and re-activation by the user. If system I/O registers 125 are implemented in undocumented addressable locations, third party software developers, including operating system software developers, will typically not be able to address these system I/O registers 125. If system I/O registers 125 are implemented as "write once" registers, third party software developers will not be able to manipulate the contents of these registers because a write operation to these registers will occur during POST.

Because the present invention makes use of system I/O registers for the purpose of gating the DCSAS input pin of a PD, existing and future operating system software will not override or otherwise ignore a user's affirmative request that the desired enablement status of a particular PD be disable or re-enable. Once the enablement status of a PD is changed to disable (ie., a PD is disabled) using this hardware-based solution, operating system software will not attempt to assign system resources to a device which a user has specifically disabled.

While the specification describes a preferred embodiment of the invention, one skilled in the art would readily recognize that other various changes and modifications may be made without departing from the spirit thereof. For instance, those of ordinary skill in the art will recognize that there are many alternative implementations to gate the DCSAS to a PD. The use of an AND gate combining as inputs the DCSAS coming from the peripheral device bus and the CONFIG ENABLE signal coming from a bit set in system I/O registers is but one specific implementation of gating DCSAS.

Therefore, it will be appreciated by those of ordinary skill having the benefit of this disclosure, that numerous variations from the foregoing illustrations will be possible without departing from the inventive concept described therein. Accordingly, it is the claims set forth below, and not merely the foregoing illustrations, which are intended to define the exclusive rights claimed in this application.

What is claimed is:

1. A system for disabling and re-enabling at least one peripheral device in a computer system, comprising:

(a) at least one central processing unit;

(b) at least one host bus coupled to said at least one central processing unit for transmitting digital signals from and to said at least one central processing unit;

(c) at least one host-bus-to-peripheral-device-bus bridge coupled to said at least one host bus;

(d) at least one peripheral device, wherein each of said at least one peripheral device includes a readable and writeable device-configuration-space connected to a device-configuration-space-access-signal input pin;

(e) at least one peripheral device bus coupled between said at least one host-bus-to-peripheral-device-bus bridge and said at least one peripheral device for transmitting digital signals between said at least one host-bus-to-peripheral-device-bus bridge and said at least one peripheral device, wherein said digital signals include for each of said at least one peripheral device a device-configuration-space-access-signal directed towards said device-configuration-space-access-signal input pin, a particular one of said device-configuration-space-access-signal made active when an access operation is to be performed on said device-configuration-space of a particular one of said at least one peripheral device towards which said particular one of said device-configuration-space-access-signal is directed; and (f) means for selectively disabling and re-enabling said at least one peripheral device, upon request by a user of said computer system, comprises;

(i) at least one means responsive to user-specified input for indicating with a digital signal a desired enablement status of said particular one of said at least one peripheral device; and (ii) at least one means for combining said particular active device-configuration-space-access-signal and said user-specified digital signal as inputs to an electronic logic gate, with an output from said electronic logic gate providing a resulting signal to said device-configuration-space-access-signal input pin of said particular one of said at least one peripheral device towards which said particular active device-configuration-space-access-signal is directed.

2. A system in accordance with claim 1, wherein said electronic logic gate is an AND gate.

3. A system in accordance with claim 1, wherein said means responsive to user-specified input for indicating with a digital signal comprises:

(a) at least one set of system I/O registers coupled to said at least one central processing unit, said registers having a plurality of bits that are capable of digitally representing 1's and 0's in response to instructions executed by said at least one central processing unit, and said plurality of bits including for each of said at least one peripheral device a bit corresponding to said digital signal indicating said desired enablement status of said at least one peripheral device; and (b) a BIOS memory coupled to said at least one central processing unit and containing firmware instructions, said firmware instructions executable by said at least one central processing unit for performing I/O and other low-level functions in said computer system, including executable firmware instructions for manipulating said bit corresponding to said digital signal indicating said desired enablement status of said at least one peripheral device.

4. A system in accordance with claim 3, wherein said means for combining comprises, an AND gate having a first input, a second input, and an output to be provided to said device-configuration-space-access-signal input pin of said particular one of said at least one peripheral device, said first input corresponding to said particular 'active' device-configuration-space-access-signal directed towards said device-configuration-space-access-signal input pin of said particular one of said at least one peripheral device, said second input corresponding to said bit corresponding to said digital signal indicating said desired enablement status of said particular one of said at least one peripheral device, and said output corresponding to a signal resulting from performing a Boolean AND operation on said first and said second inputs.

5. In a computer system having at least one central processing unit, at least one host-bus-to-peripheral-device-bus bridge communicatively coupled to said at least one central processing unit and at least one peripheral device bus, said at least one host-bus-to-peripheral-device-bus bridge capable of sending at least one device-configuration-space-access-signal to at least one peripheral device having a readable and writeable device-configuration-space, said at least one peripheral device communicatively coupled by at least one peripheral device bus to said at least one host-bus-to-peripheral-device-bus, one of said at least one device-configuration-space-access-signal directed towards a device-configuration-space-access-signal input pin of a target peripheral device when said device-configuration-space of said target peripheral device is the subject of an access operation, and at least one set of system I/O registers containing a readable and writeable CONFIG ENABLE bit location corresponding to and for each of said at least one peripheral device, said CONFIG ENABLE bit location indicating according to an affirmative user request a desired enablement status for any of said at least one peripheral device to which said CONFIG ENABLE bit location corresponds, a method of selectively disabling and re-enabling at least one peripheral device, comprising:

(a) intercepting said one of said at least one device-configuration-space-access-signal before said one of said at least one device-configuration-space-access-signal reaches said device-configuration-space-access-signal input pin of said target peripheral device;

(b) providing said one of said at least one device-configuration-space-access-signal to a first input of a digital gate;

(c) providing a signal corresponding to the content of said CONFIG ENABLE bit location corresponding to said target peripheral device to a second input of said digital gate; and (d) delivering a digital signal resulting from an operation of said digital gate to said device-configuration-space-access-signal input pin of said target peripheral device.

6. A method in accordance with claim 5, wherein said digital gate is a Boolean logic gate.

7. A method in accordance with claim 6, wherein said digital Boolean logic gate is an AND gate.

8. A system for disabling and re-enabling at least one peripheral device in a computer system, comprising;

(a) at least one central processing unit;

(b) at least one host bus coupled to said at least one central processing unit for transmitting digital signals from and to said at least one central processing unit;

(c) at least one host-bus-to-peripheral-device-bus bridge coupled to said at least one host bus;

(d) at least one peripheral device, wherein each of said at least one peripheral device includes a readable and writeable device-configuration-space connected to a device-configuration-space-access-signal input pin;

(e) at least one peripheral device bus coupled between said at least one host-bus-to-peripheral-device-bus bridge and at least one peripheral-device-bus-to-peripheral-device-bus bridge for transmitting digital signals between said at least one host-bus-to-peripheral-device-bus bridge and said at least one peripheral-device-bus-to-peripheral-device-bus bridge, said peripheral-device-bus-to-peripheral-device-bus bridge also coupled to at least one other peripheral device bus;

(f) at least one of said other peripheral device buses coupled to said at least one peripheral device for transmitting digital signals between said at least one peripheral-device-bus-to-peripheral-device-bus bridge and said at least one peripheral device, wherein said digital signals transmitted between said at least one peripheral-device-bus-to-peripheral-device-bus bridge and said at least one peripheral device include for each of said at least one peripheral device a device-configuration-space-access-signal directed towards said device-configuration-space-access-signal input pin, a particular one of said device-configuration-space-access-signal made active when an access operation is to be performed on said device-configuration-space of a particular one of said at least one peripheral device towards which said particular one of said device-configuration-space-access-signal is directed; and (g) means for selectively disabling and re-enabling said at least one peripheral device, upon request by a user of said computer system, comprises:

(i) at least one means responsive to user-specified input for indicating with a digital signal a desired enablement status of said particular one of said at least one peripheral device; and (ii) at least one means for combining said particular active device-configuration-space-access-signal and said user-specified digital signal as inputs to an electronic logic gate, with an output from said electronic logic gate providing a resulting signal to said device-configuration-space-access-signal input pin of said particular one of said at least one peripheral device towards which said particular active device-configuration-space-access-signal is directed.

9. A system in accordance with claim 8, wherein said electronic logic gate is an AND gate.

10. A system in accordance with claim 8, wherein said means responsive to user-specified input for indicating with a digital signal comprises:

(a) at least one set of system I/O registers coupled to said at least one central processing unit, said registers having a plurality of bits that are capable of digitally representing 1's and 0's in response to instructions executed by said at least one central processing unit, and said plurality of bits including for each of said at least one peripheral device a bit corresponding to said digital signal indicating said desired enablement status of said at least one peripheral device; and (b) a BIOS memory coupled to said at least one central processing unit and containing firmware instructions, said firmware instructions executable by said at least one central processing unit for performing I/O and other low-level functions in said computer system, including executable firmware instructions for manipulating said bit corresponding to said digital signal indicating said desired enablement status of said at least one peripheral device.

11. A system in accordance with claim 10, wherein said means for combining comprises, an AND gate having a first input, a second input, and an output to be provided to said device-configuration-space-access-signal input pin of said particular one of said at least one peripheral device, said first input corresponding to said particular 'active' device-configuration-space-access-signal directed towards said device-configuration-space-access-signal input pin of said particular one of said at least one peripheral device, said second input corresponding to said bit corresponding to said digital signal indicating said desired enablement status of said particular one of said at least one peripheral device, and said output corresponding to a signal resulting from performing a Boolean AND operation on said first and said second inputs.

12. In a computer system having at least one central processing unit, at least one host-bus-to-peripheral-device-bus bridge communicatively coupled to said at least one central processing unit and at least one peripheral device bus, at least one peripheral-device-bus-to-peripheral-device-bus bridge communicatively coupled to said at least one peripheral device bus and at least one other peripheral device bus, said at least one peripheral-device-bus-to-peripheral-device-bus bridge capable of sending at least one device-configuration-space-access-signal through said at least one other peripheral device bus to at least one peripheral device having a readable and writeable device-configuration-space, one of said at least one device-configuration-space-access-signal directed towards a device-configuration-space-access-signal input pin of a target peripheral device when said device-configuration-space of said target peripheral device is the subject of an access operation, and at least one set of system I/O registers containing a readable and writeable CONFIG ENABLE bit location corresponding to and for each of said at least one peripheral device, said CONFIG ENABLE bit location indicating according to an affirmative user request a desired enablement status for said at least one peripheral device to which said CONFIG ENABLE bit location corresponds, a method of selectively disabling and re-enabling at least one peripheral device, comprising:

(a) intercepting said one of said at least one device-configuration-space-access-signal before said one of said at least one device-configuration-space-access-signal reaches said device-configuration-space-access-signal input pin of said target peripheral device;

(b) providing said one of said at least one device-configuration-space-access-signal to a first input of a digital gate;

(c) providing a signal corresponding to the content of said CONFIG ENABLE bit location corresponding to said target peripheral device to a second input of said digital gate; and (d) delivering a digital signal resulting from an operation of said digital gate to said device-configuration-space-access-signal input pin of said target peripheral device.

13. A method in accordance with claim 12, wherein said digital gate is a Boolean logic gate.

14. A method in accordance with claim 13, wherein said digital Boolean logic gate is an AND gate.

* * * * *